A. V. SAMMIS.
VALVE.
APPLICATION FILED AUG. 8, 1916.
1,409,116.
Patented Mar. 7, 1922.
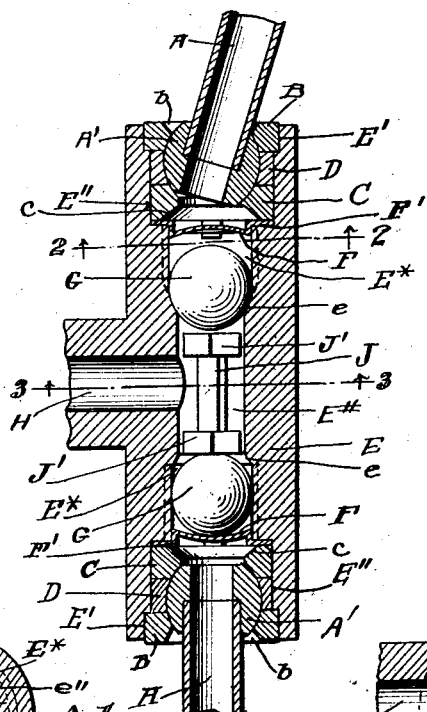
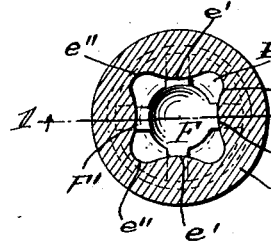
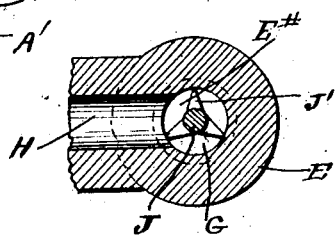
Inventor
Albert V. Sammis
by John Lotka
Attorney.

UNITED STATES PATENT OFFICE.

ALBERT V. SAMMIS, OF HUNTINGTON, NEW YORK, ASSIGNOR TO FIRE GUN MANUFACTURING COMPANY, INC., OF HUNTINGTON, NEW YORK, A CORPORATION OF NEW YORK.

VALVE.

1,409,116.  Specification of Letters Patent.   Patented Mar. 7, 1922.

Application filed August 8, 1916. Serial No. 113,780.

*To all whom it may concern:*

Be it known that I, ALBERT V. SAMMIS, a citizen of the United States, and a resident of Huntington, in the county of Suffolk and State of New York, have invented certain new and useful Improvements in Valves, of which the following is a specification.

My invention relates to valves, and particularly to valves employed in pairs in conjunction with a separator which ensures that at all times, at least one of the valves will be open or unseated. The object of my invention is to provide a very simple, compact, and efficient construction of the above-indicated character, in which each of the valves will have a certain freedom of motion so as to always properly adjust itself to its seat, yet the separator will perform its usual function in a perfectly satisfactory way.

A typical example of my invention will now be described in detail with reference to the accompanying drawings, and the novel features will then be pointed out in the appended claims.

In the said drawings, Fig. 1 is a longitudinal section of my improved valve and separator arrangement; Fig. 2 is a cross section on line 2—2 of Fig. 1; and Fig. 3 is a central section on line 3—3 of Fig. 1.

I have shown my improved valve and separator arrangement in a connection which adapts it for use with a fire-extinguisher of the type disclosed in my pending application for Letters Patent filed in the United States Patent Office on July 24th, 1915, Serial No. 41,650, but it will be understood that my invention is applicable to other devices as well.

A indicates two swinging intake tubes of the kind set forth in my said application, each of said tubes having secured rigidly to its inner end, a perforated ball A', which in my present construction is engaged by, or seated upon, the following three parts or members: First, an outer ring B having a seat of spherical curvature, to fit said ball; second, an inner ring C, having on its outer surface a seat of spherical curvature, to fit said ball; and, third, a ring D of felt or like elastic or compressible material, interposed between the rings B and C and in frictional contact with the ball A', which ring D will shape itself to conform to the ball portions with which it is in contact. The ball ends A', as well as the rings B, C, D, are located within a valve casing E, the construction being provided in duplicate. The outer rings B are received within chambers of comparatively large diameter situated at the ends of said casing, as indicated at E', and then follows a somewhat narrower chamber E'' which receives the rings C and D, the shoulder between said two chambers forming a stop to properly position the outer ring B. The said chambers E', E'' are of circular cross section, as are also the rings B, C, D. Between the chambers E'', the valve casing E contains two ball-guiding chambers E*, and between these, a central or inner chamber E#. Each of the chambers E* also contains the major portion of a plate F to limit the outward movement of the valve or ball G, and the face of said plate or stop toward the ball valve is shown as curved spherically, with a radius considerably larger than that of the ball, so that there shall be practically only a point contact between the ball and its stop, whereby sticking of the ball to the stop plate F is prevented. This stop plate is shown as made with prongs F' seated upon the shoulder formed by the junction of the chambers E'' and E*. The spaces between the prongs allow the fluid or liquid to pass freely from the chambers E'' to the chambers E*. From the central chamber E# a delivery channel or passage H conducts the liquid or fluid farther, say to the pump (not shown) the suction of which draws such liquid from the reservoir (not shown) into which the free ends of the intake tubes A extend, through the perforated ball A', the inner ring C within the chamber E'', between the prongs of the stop F, and through the chambers E* and E# to the passage H. Generally, only one of the ball-valves G will be open, an instance of such position being shown in Fig. 1, where the upper ball G rests by gravity on the spherically-curved seat e formed at the junction of the chamber E* with the chamber E#. The lower ball G is shown as resting on top of the lower stop plate F, and therefore off its seat. The ball-guiding chambers E*, as shown particularly in Fig. 2, are not of circular cross section, but somewhat star-shaped, being formed with a plurality of convex guiding surfaces e', which are tangent to a circle of practically the same diameter as the balls G. These balls, therefore, are constrained to move in a straight line toward or from their seats e, and cannot move laterally, but they are capable of a swinging or rotary movement about their own axes, so that each ball G will be free to adjust itself to its seat. The outwardly extending portions $e''$ between adjacent guiding surfaces $e'$ from longitudinal passages through which the liquid may flow alongside and around the ball G when the latter is lifted off its seat e.

In the central or inner chamber E# is guided for longitudinal movement the separator J, preferably made with heads $J'$ of triangular cross section (Fig. 3) having concave side faces, the edges or corners of said heads being in guiding engagement with the cylindrical wall of the chamber E#, while the stem or body of the separator is out of contact with the walls of said chamber and preferably cylindrical. The connection or passage H leads from the chamber E# at a point which is between the heads $J'$.

The outer rings B are preferably provided, in their outer surfaces, with surfaces b tapered conically in an inward direction, and forming a stop to limit the swinging of the intake tube A on the center of the ball $A'$, as indicated in Fig. 1 for the upper tube A. Each inner ring C is preferably formed on its inner surface, with an inwardly-flaring surface c, the purpose of which is to afford a wider path for the liquid on its passage from said ring C to the channel portions or longitudinal passages $e''$ in the chamber E*.

The length of the separator J, $J'$ is such that it is impossible for both ball valves G to be seated or closed at the same time, since this would interfere with the proper operation of the device in which my improved valve arrangement is employed. When the valve-and-separator arrangement is held in such a position that the separator is vertical, as in Fig. 1, or inclined at a sufficient angle to cause it to gravitate to the lower portion of the central chamber E#, only one ball valve G (the lower one) will be open, the other valve being closed. This will occur in the large majority of cases. When however the apparatus is held so that the separator axis will be horizontal, or nearly so, both valves G may remain open at the same time, the satisfactory operation of the device not being affected by this unusual position.

The fact that each ball-valve G is guided to its seat e rectilinearly, prevents the valve from getting caught and stuck in angles or pockets, while the freedom which is left to each of said ball-valves, to turn on its own axis, independently of the separator J, $J'$ insures a proper seating of the valve. The separator J, $J'$ acts to preserve a certain minimum distance between the two ball-valves G, so that it is impossible for them to become seated at the same time, that is to say, at least one of the valves G is open at any particular time. In earlier constructions, the two balls were secured rigidly to the ends of a separating bar, and there was therefore no possibility of the ball's turning on its axis, relatively to the separator, and independently both of the separator and of the other ball. It will be understood that my invention, as shown, applies particularly to constructions in which the two seats e of the ball valves G are located between the said valves, so as to engage the inner or opposing faces of the balls.

The prongs $F'$ have their outer ends fitted within the chambers $E''$ in contact with the inner rings C, and these prongs are so positioned (see Fig. 2) as to register with the innermost points of the guiding surfaces $e'$, so that the channels $e''$ are not obstructed by the prongs.

The rings D, being made of felt or like material, will absorb some of the liquid passing through the device (the joints between the perforated balls $A'$ and the rings B, C are generally not liquid-tight), and this will cause the rings D to swell so as to produce a liquid-tight joint at the balls $A'$ yet allow the tubes A to swing freely.

The rings B, C, D together constitute a holder for a perforated ball $A'$.

I claim as my invention:

1. A valve casing having two valve seats and a delivery passage leading therefrom, together with intake passages leading to the opposite sides of said seats, ball valves movable toward and from said seats on the intake side thereof, and a separator interposed between said valves and engaging them loosely so that each ball may turn independently about its own axis, said separator comprising two heads guided along the walls of the said delivery passage, and a reduced stem connecting said heads.

2. A valve casing having two valve seats and a delivery passage leading therefrom, together with intake passages leading to the opposite, outer sides of said seats, valves movable toward and from said seats on the intake side thereof, and a separator interposed between said valves and comprising two heads having edges or corners in guiding engagement with the walls of said delivery passage, and a reduced stem connecting said heads.

3. A valve casing having a passage with a valve seat, a valve movable toward and from said seat, longitudinal spaced guide ribs located on that side of the seat toward which said valve opens, and a stop arranged to limit the opening movement of the valve and provided with securing portions in registry with said ribs, and with apertures between said securing portions.

4. A valve casing having a valve seat, a delivery passage on one side of said seat, an intake passage on the other side of said seat, an intake tube in the outer portion of said intake passage, the inner portion of the intake passage being formed with guiding surfaces approaching the center of said passage, and with spaced longitudinal portions or channels at a greater distance from said center, an apertured stop located between said intake tube and the valve seat and provided with prongs between said longitudinal channels and a valve guided along said guiding surfaces and movable between said stop and said seat.

In testimony whereof I have signed this specification.

ALBERT V. SAMMIS.